(12) United States Patent
Smith (10) Patent No.: US 8,436,485 B1
(45) Date of Patent: May 7, 2013

(54) WIND POWERED TURBINE MOTOR FOR MOTOR VEHICLES

(76) Inventor: Leo Smith, Jamaica, NY (US)

( * ) Notice: Subject to any disclaimer, the term of this patent is extended or adjusted under 35 U.S.C. 154(b) by 413 days.

(21) Appl. No.: 12/710,290

(22) Filed: Feb. 22, 2010

(51) Int. Cl.
*F03D 9/00* (2006.01)

(52) U.S. Cl.
USPC .......................................................... 290/55

(58) Field of Classification Search ...................... 290/55
See application file for complete search history.

(56) References Cited

U.S. PATENT DOCUMENTS

| | | | |
|---|---|---|---|
| 452,546 A | 8/1891 | Mitchell | |
| 757,800 A | 4/1904 | Williams | |
| 1,181,988 A | 5/1916 | Breitung | |
| 2,941,613 A * | 6/1960 | Di Perna | 180/2.2 |
| 3,374,849 A * | 3/1968 | Redman | 180/2.2 |
| 3,444,946 A * | 5/1969 | Waterbury | 180/2.2 |
| 3,556,239 A * | 1/1971 | Spahn | 180/65.25 |
| 3,621,930 A | 11/1971 | Dutchak | |
| 3,878,913 A * | 4/1975 | Lionts et al. | 180/2.2 |
| 4,168,759 A | 9/1979 | Hull | |
| 5,296,746 A | 3/1994 | Burkhardt | |
| 5,908,217 A | 6/1999 | Englar | |
| 6,098,733 A * | 8/2000 | Ibaraki et al. | 180/65.28 |
| 6,138,781 A | 10/2000 | Hakala | |
| 6,700,215 B2 | 3/2004 | Wu | |
| 7,057,304 B2 * | 6/2006 | Ueda | 290/40 C |
| 7,147,069 B2 | 12/2006 | Maberry | |
| 7,547,983 B2 * | 6/2009 | Sabella | 290/40 C |
| 7,828,091 B2 * | 11/2010 | Wedderburn et al. | 180/2.2 |
| 7,868,476 B2 * | 1/2011 | Baca et al. | 290/55 |
| 2005/0184529 A1 * | 8/2005 | Ueda | 290/40 C |

FOREIGN PATENT DOCUMENTS

| | | |
|---|---|---|
| DE | 3226381 | 1/1984 |
| DE | 4138898 | 6/1993 |
| FR | 2830993 A1 * | 4/2003 |

\* cited by examiner

*Primary Examiner* — Joseph Waks
(74) *Attorney, Agent, or Firm* — Michael I. Kroll (57) ABSTRACT

A wind powered Engine wherein incoming air flow rotate at least one fan connected to a generator that converts the mechanical energy to electrical energy to provide electrical current to the existing electrical system or a backup rechargeable battery bank. The motor or generator is swivel mounted up to 45° to allow for the rotation thereof to provide maximum proficiency and incorporating a plurality of sensors in electrical communication with a display having audio and visual properties for indicating the status of the Engine.

11 Claims, 10 Drawing Sheets

WIND POWERED TURBINE MOTOR FOR MOTOR VEHICLES

BACKGROUND OF THE INVENTION

1. Field of the Invention

The present invention relates generally to wind turbines and more specifically to a wind powered turbine motor for motor vehicles. The wind powered turbine motor, hereinafter referred to as the Smith Engine is designed to harvest energy from air moving through a vehicle during its normal operation. The motor comprises at least one housing conduit of any shape or size having air ingress and egress ports with the motor located therebetween. The air ingress port has a screen of any material, size and dimension to prevent passage of any organic or inorganic material that may impede the optimal performance of the motor. A frame of any material, size and dimension is secured within the channel through bore comprising a channel-anchored portion and pivotal portion allowing for the continuance of its optimal energy harvesting position through self alignment established by the motive force of air flow moving through the channel. At least one free wheeling fan having blades of any material, size and dimension is rotatively mounted by shaft of any material, size and dimension through the pivotal frame portion via bearing to at least one electric motor or generator mounted by fasteners of any material, size and dimension to said pivotal frame portion with the pivotal frame portion extending through a frame-arm to a frame vane providing for optimal positioning of the Smith Engine using the direction of incoming wind with the wind forming the fan's rotational motive force driving the electric motor or generator shaft for producing an electric current. The electric motor/generator has a plurality of sensors for monitoring the components of the motor/generator in electrical communication with a display enabled with audio and visual indictors. The motor/generator has positive and negative leads connected to a voltage regulator and inverter before being used or stored by the vehicle as an additional energy source with the vehicle taken from the group of land, water and air vehicles.

2. Description of the Prior Art

There are other wind driven devices designed for generating electricity. Typical of these is U.S. Pat. No. 452,546 issued to Mitchell on May 19, 1891.

Another patent was issued to Williams on Apr. 19, 1904 as U.S. Pat. No. 757,800. Yet another U.S. Pat. No. 1,181,988 was issued to Breitung on May 9, 1916 and still yet another was issued on Nov. 23, 1971 to Dutchak as U.S. Pat. No. 3,621,930.

Another patent was issued to Hull on Sep. 25, 1979 as U.S. Pat. No. 4,168,759. Yet another U.S. Pat. No. 5,296,746 was issued to Burkhardt on Mar. 22, 1994. Another was issued to Englar on Jun. 1, 1999 as U.S. Pat. No. 5,908,217 and still yet another was issued on Oct. 31, 2000 to Hakala as U.S. Pat. No. 6,138,781.

Another patent was issued to Wu on Mar. 2, 2004 as U.S. Pat. No. 6,700,215. Yet another U.S. Pat. No. 7,147,069 was issued to Marberry on Dec. 12, 2006. Another was issued to Kolbeck on Jan. 19, 1984 as German Patent No. DE3226381 and still yet another was issued on Jun. 3, 1993 to Wird Nachtrawglich Benannt as German Patent No. DE4138898.

U.S. Pat. No. 452,546

Inventor: James M. Mitchell

Issued: May 19, 1891

In a mechanism for generating electricity, the combination; with a drum or casing, of a wind-wheel shaft journaled in the same, a field-magnet surrounding said shaft, an armature and commutator of a dynamo mounted on said shaft, a pivoted support for the casing, conductors connecting the brushes of the dynamo with the device in which the current is used, and means whereby the wind wheel shall be presented to the action of shifting currents of air without interrupting the flow of the current, substantially as described.

U.S. Pat. No. 757,800

Inventor: Joseph J. Williams

Issued: Apr. 19, 1904

In a wind-motor, a moving part having impact-surfaces, a casing inclosing said part, a nozzle connected with the casing and arranged to direct air-currents against said surfaces, a movable vane exposed to the air-cur rents, a plurality of generators operatively connected with the moving part, and means between the vane and generators for controlling the operation of the latter.

U.S. Pat. No. 1,181,988

Inventor: Edward N. Breitung

Issued: May 9, 1916

In a boat, the combination with a wind wheel adapted to act as a sail, a dynamo-electric machine, a clutch for coupling the machine to the winding wheel, a propeller, an internal combustion engine, a clutch for coupling the engine to the dynamo electric machine, a clutch for coupling the engine to the propeller, a storage battery, a transmission circuit, translating devices connected to said circuit, selective switches for connecting the battery to the transmission circuit, the battery to the dynamo electric machine or the machine to the transmission circuit and means for regulating the field excitation of the dynamo electric machine whereby the machine may operate either as motor or generator as desired.

U.S. Pat. No. 3,621,930

Inventor: David D. Dutchhak

Issued: Nov. 23, 1971

A system of electricity generation for electric motor-driven vehicles consisting of a wind tunnel mounted on an equipped vehicle having open forward and rearward air intake and discharge ends, respectively, the forward open end being flared outwardly constituting an air scoop; plus a Venturi within the air tunnel communicating with the air scoop, and a battery of wind-activated electrically interconnected generators mounted within the tunnel in line communication with its open forward and rearward air intake and discharge ends.

U.S. Pat. No. 4,168,759

Inventor: R. Dell Hull

Issued: Sep. 25, 1979

An automobile including a body provided with a passenger compartment and a uniquely shaped front end section whereby the forward motion of the automobile will result in a highly effective channeling of oncoming air to the roof of the passenger compartment. An opening is provided at the forefront of the roof contiguous with the downstream end of the front air scoop, and communicating with a chamber arranged above the passenger compartment of the automobile. The chamber includes a rear exit vent. Within the chamber there is an angularly oriented impeller positioned in the direct path of the air forced through the chamber by the front air scoop whereby the impeller is driven by the air flow. The impeller is connected by a suitable mechanical coupling to a generator to provide auxiliary power for the automobile.

U.S. Pat. No. 5,296,746

Inventor: Harry E. Burkhardt

Issued: Mar. 22, 1994

The invention is to a wind charging system for an automobile which includes a wind driven turbine blade that is attached to a plurality of alternators by a gearing system. The gearing system includes a large gear driving a plurality of small gears, each attached to an alternator. The system is mounted in a single frame that mounts in the engine compartment of a standard automobile.

U.S. Pat. No. 5,908,217

Inventor: Robert J. Englar

Issued: Jun. 1, 1999

A blowing system for controlling the aerodynamics of a ground vehicle comprises a source of compressed air, a valve for regulating the flow of the compressed air, and a plenum for discharging the air at a rear portion of the vehicle. The air discharged through the plenum prevents flow separation and consequently reduces the drag on the vehicle. It may also increase lift, reducing effective weight and thus rolling resistance of the tires, or decrease lift to improve tire traction and handling. The blowing system may have separate plenums for the left and right sides of the vehicle whereby vortex roll-up and flow separation which occur on only one side of the vehicle may be eliminated. Asymmetrical blowing of only one plenum will produce rolling and yawing moments to restore the vehicle's lateral/directional stability when exposed to a side wind. Further, the blowing system may have a lower plenum for reattaching flow, generating a negative lift or download to increase traction, braking, and handling and for generating pitch trim. The blowing system may have a number of sensors for detecting various conditions, such as the direction and pressure of a relative wind, turbulence at the rear of the vehicle, braking, or angle of steering. The blowing system may be responsive to one or more of these conditions to selectively adjust the aerodynamics of the vehicle.

U.S. Pat. No. 6,138,781

Inventor: James R. Hakala

Issued: Oct. 31, 2000

A wind-powered system for generating electricity in a vehicle or other power consumption unit generally having a multi-stage impeller system for driving an electric generator/alternator, an improved air channel, and an improved start-up/back-up air compressor. The multi-stage impeller system includes high-speed impellers and low-speed impellers for efficient energy conversion throughout the entire range of a vehicle's operating speeds or forward motion. The improved start-up/back-up air compressor discharges air directly to the multi-stage impellers, abolishing the need for heavy air accumulators. The improved air channel includes a specially formed air scoop/vortex, a wind tube/tunnel and a heating element to increase the velocity of the air passing therethrough.

U.S. Pat. No. 6,700,215

Inventor: Shiang-Huei Wu

Issued: Mar. 2, 2004

Generators for use with a fossil fuel- and electric-powered vehicle having a plurality of different types of generator units mounted on a vehicle to supplement the power supply of the vehicle. Propeller generator units and turbine generator units utilize the force of oncoming wind to output electricity. The rolling wheel generator units consist of installing an additional fifth wheel, sixth wheel, seventh wheel, and eighth wheel of a dedicated generator roller wheel set on any of the main wheel axles disposed on the vehicle undercarriage such that by circumvolution around the axle when the vehicle is proceeding forward, the additionally installed generator roller wheel set rotates generator to produce electricity. A matching rectifier center caches the electric power produced by each generator unit and, following accumulation, directly supplies electricity to the vehicle or recharges its storage battery.

U.S. Pat. No. 7,147,069

Inventor: Robert L. Mayberry

Issued: Dec. 12, 2006

The invention relates to a vehicle including a body having a one or more openings. The body is configured, such as through the use of air guides, to receive an airflow through the one or more openings. An electrical generator assembly is mounted inside the vehicle and in fluid communication with a respective opening to receive the airflow, and wherein a separate electric generator assembly is associated with each of the openings. Each electrical generator assembly includes a housing, an electric generator mounted to the housing and a turbine assembly coupled to the electric generator.

Germany Patent Number DE3226381

Inventor: Guenther W. Kolbeck

Issued: Jan. 1, 1984

A drive device for an electric car (1) comprises a battery (9) via which at least one electric motor (3) that is provided is supplied with power. In order to increase the range and radius of action of the electric car (1), a power supply device is provided in the form of a windmill or wind vanes (13) which can be driven by the wind produced by motion, and having a generator arranged downstream, the windmill or wind vanes (13) being arranged directly in front of or behind parts of the car which increase the drag, for example the front or rear wheels (5, 7).

Germany Patent Number DE4138898

Inventor: Der Erfinder Wird Nachtraeglich Benannt

Issued: Jun. 3, 1993

The auxiliary power source has a dynamo (3,3a) which is mounted on each end of a shaft and rotated with it. Each dynamo, e.g., charges a 12-volt battery. Three or more such bladed shafts with the dynamos and batteries provide the second power plant in the mobile vehicle. An approximately one meter long, 10-15 cm wide surface under the bladed shaft covers the wind produced by the air resistance, and conducts the wind to the upper half of the bladed shaft, and can act to block the travel wind. USE/ADVANTAGE—Auxiliary power plant. For travel in cities. Prim. petrol or diesel engine can be switched off to reduce pollution. Dynamo batteries can be re-charged by switching on engine.

While these wind driven vehicles may be suitable for the purposes for which they were designed, they would not be as suitable for the purposes of the present invention, as hereinafter described.

SUMMARY OF THE PRESENT INVENTION

A primary object of the present invention is to provide a wind powered turbine for motorized vehicles comprising a housing with a bore tunnel through which the air flow passes to rotate the fan(s) and power the electric motor/generator contained within.

An additional object is to provide a wind powered turbine motor for motorized vehicles wherein the electric motor/generator converts the mechanical energy of the wind driven fan(s) to electrical energy.

Yet an additional object is to provide a wind powered turbine motor for motorized vehicles wherein the electrical current is delivered to the engine for operational usage and/or rechargeable battery banks for storage for use when needed.

Still yet an additional object is to provide a wind powered turbine generator for motorized vehicles wherein a motor or generator is swivel mounted to allow for maximum proficiency.

An additional object is to provide a wind powered turbine motor having a pivotal frame terminating in a vane serving as a self alignment feature whereby optimal fan position is obtained to provide maximum power to the main shaft and thus improved generation of power.

Yet another object of the present invention is to provide a wind powered turbine engine that produces either AC or DC power.

Still another object of the present invention is to provide a wind powered turbine motor having wire leads that are connected to the existing electrical system in either series or parallel configuration.

Still yet another object of the present invention is to provide a wind powered turbine motor that may be adapted for use with various vehicles including autos, trains, planes and boats.

A further object is to provide a wind powered turbine motor that is simple and easy to use.

A still further object is to provide wind powered turbine motor that is economical in cost to manufacture and operate.

A still yet further object of the present invention is to provide a turbine motor having a plurality of sensors for monitoring the status of the turbine motor.

Another object of the present invention is to provide a display having audio and visual functions in electrical communication with said sensors for reporting the status of the turbine motor.

Additional objects of the present invention will appear as the description proceeds.

The present invention overcomes the shortcomings of the prior art by providing a wind powered turbine motor wherein incoming air flow rotate at least one fan connected to an electric motor or generator that converts the at least one fans mechanical energy to electrical energy to provide electrical current to the existing electrical system or a backup rechargeable battery bank.

The foregoing and other objectives and advantages will appear from the description to follow. In the description, reference is made to the accompanying drawings, which forms a part hereof, and in which is shown, by way of illustration, specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawings.

DESCRIPTION OF THE REFERENCED NUMERALS

Turning now descriptively to the drawings, in which similar reference characters denote similar elements throughout the several views, the figures illustrate the Wind Turbine Motor for Motor Vehicles of the present invention. With regard to the reference numerals used, the following numbering is used throughout the various drawing figures.

10 Smith Engine for Motor Vehicles of the present invention
12 motor vehicle
14 air flow
16 bore
18 fan 20 fan blade
22 screen
24 fan shaft
26 motor/generator
28 electrical leads
29 shielded tube to protect insulated leads
30 swivel mount
31 swivel mount stop
32 movement of vehicle
34 intake port
36 rechargeable battery(s)
38 switch
40 voltage regulator
42 outlet port
44 release valve
46 power train
48 rechargeable battery
50 motor
52 rotor
54 stator
56 shaft
58 generator
60 drive shaft
62 potentiometer
63 inverter
64 alternator
66 transfer switch
68 gasoline engine
70 frame
72 fasteners
74 bearing
76 frame arm
78 vane
80 sensor(s)
82 audio visual display
84 audio visual display audio mute

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments; practitioners skilled in the art will recognize numerous other embodiments as well. For definition of the complete scope of the invention, the reader is directed to appended claims.

Figure 1:
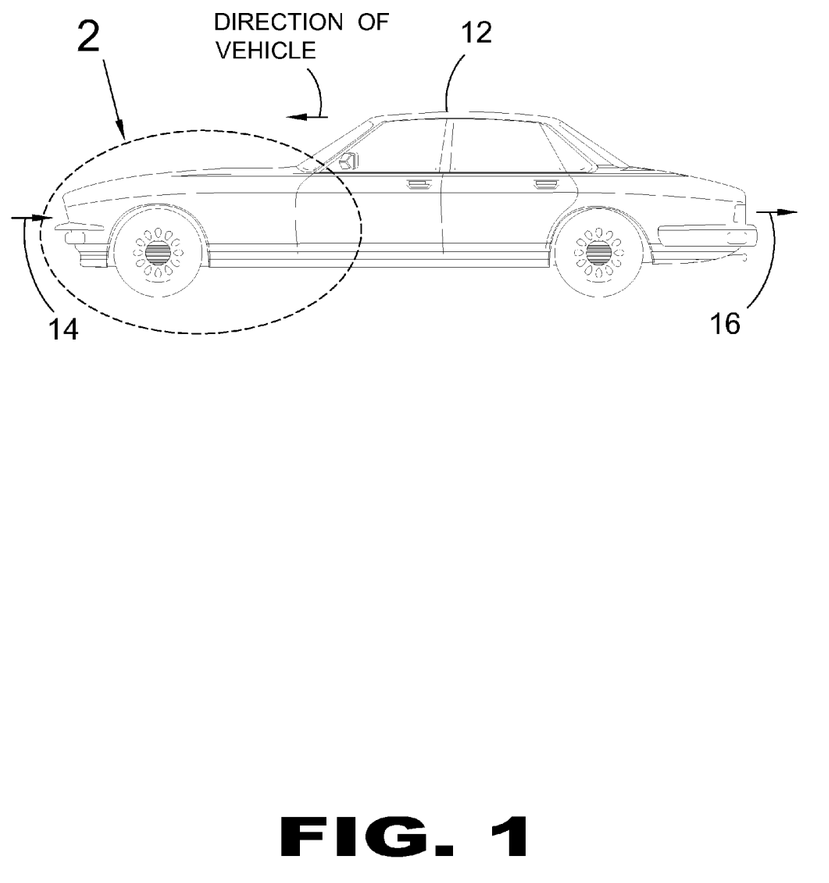
FIG. 1 is an illustrative view of the Smith Engine in use.

FIG. 1 is an illustrative view of the present invention's use 10. The present invention is a vehicle 12 that uses incoming air flow 14 harvested by the movement of the vehicle 12 to drive a wind turbine, shown in FIG. 3, before expelling the outgoing air flow 16.

Figure 2:
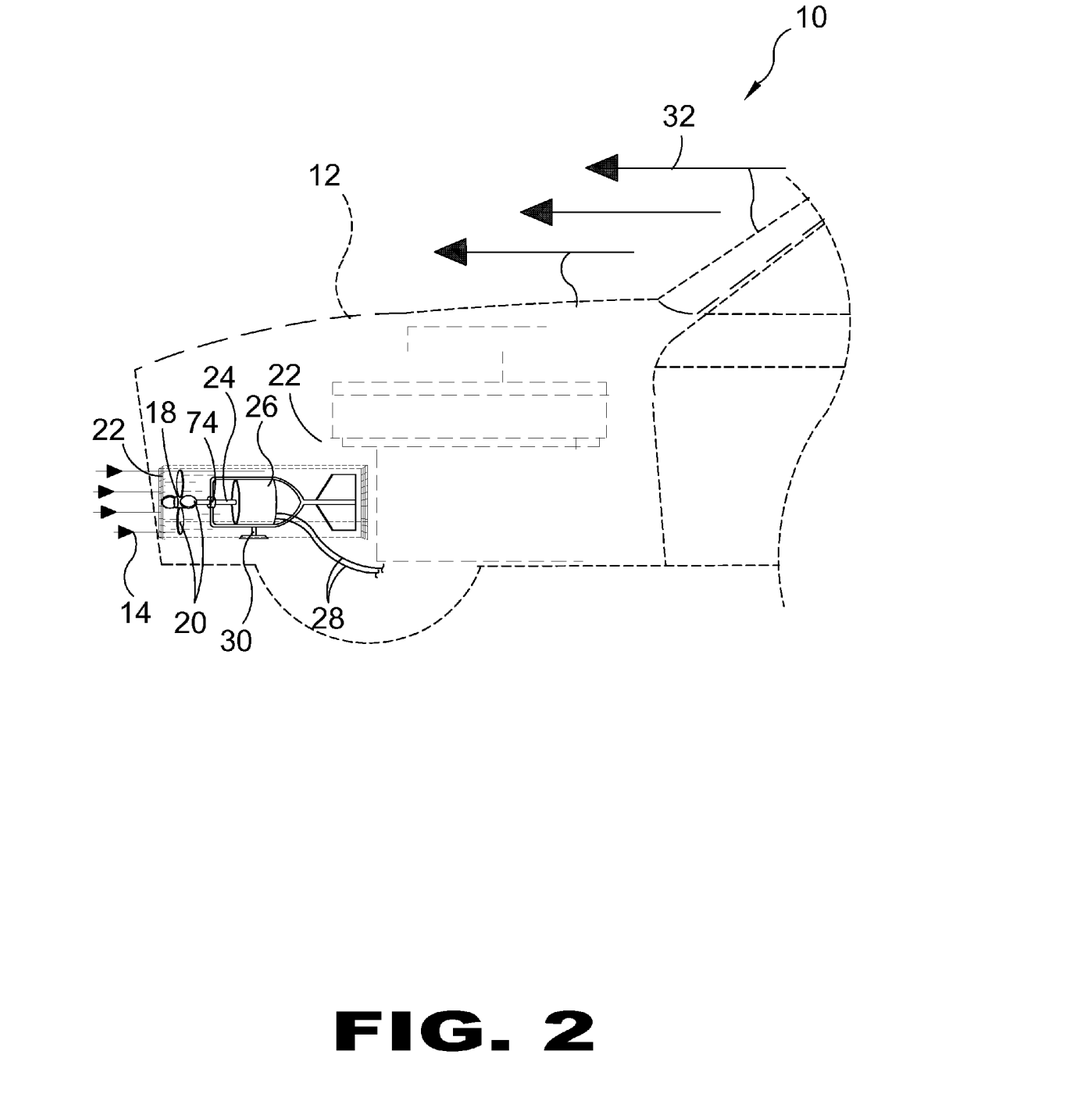
FIG. 2 is a side view of the Smith Engine in use.

FIG. 2 is a side view of the Smith Engine 10 installed in a vehicle 12. At least one fan 18 disposed proximal the screen 22 is driven by air flow 14 during vehicle movement 32. The fan 18 can have any number of blades 20 of an appropriate size, shape, thickness or material. A shaft 24 is fixed to the fan 18 and is in rotative communication with a motor/generator 26. The motor/generator 26 then converts the mechanical energy to electrical current that is delivered to its destination via a pair of leads 28. The motor/generator 26 is swivel mounted 30 to the vehicle 12 to provide maximum proficiency of air to effect the fan 18.

Figure 3:
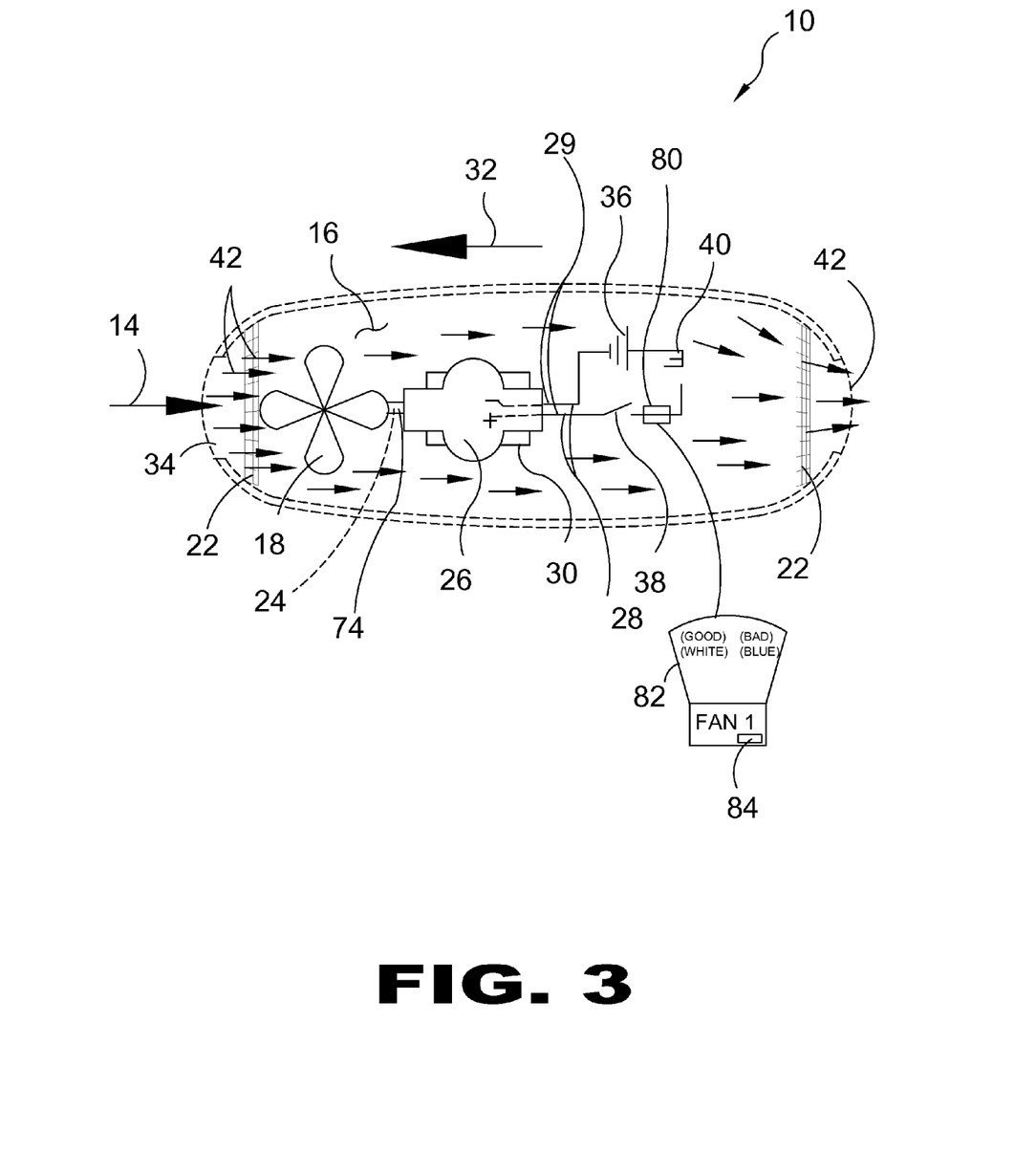
FIG. 3 is a top view of the Smith Engine.

FIG. 3 is a top view of the Smith Engine 10 in use. Shown is the air flow 14 created by the vehicle's movement 32 entering into the chute 16 via the intake port 34 22 are screens on both sides made of any size or material, and the air flow 42 causes the fan 18 to rotate. The rotation of the fan 18 turns the shaft 24 in communication with the motor/generator 26 to produce DC or AC energy accordingly with an inverter 63. The motor/generator 26 having vane 78 pivots on the swivel mount 30 to maximize the potential energy of the air flow 42. Electrical leads 28 that are shielded with rubber insulation 29 tubes to protect leads delivers the electrical current to a battery 36 that has a switch 38 and a voltage regulator 40 in line therewith. The air flow 42 then exits the chute 16 via the outlet port 42. Also shown is/are sensor(s) 80, which are positioned throughout the Smith Engine in electrical communication with display 82 enabled with audio and visual indicators for reporting the status of the Smith Engine and a button 84 for selectively muting the audio.

Figure 4:
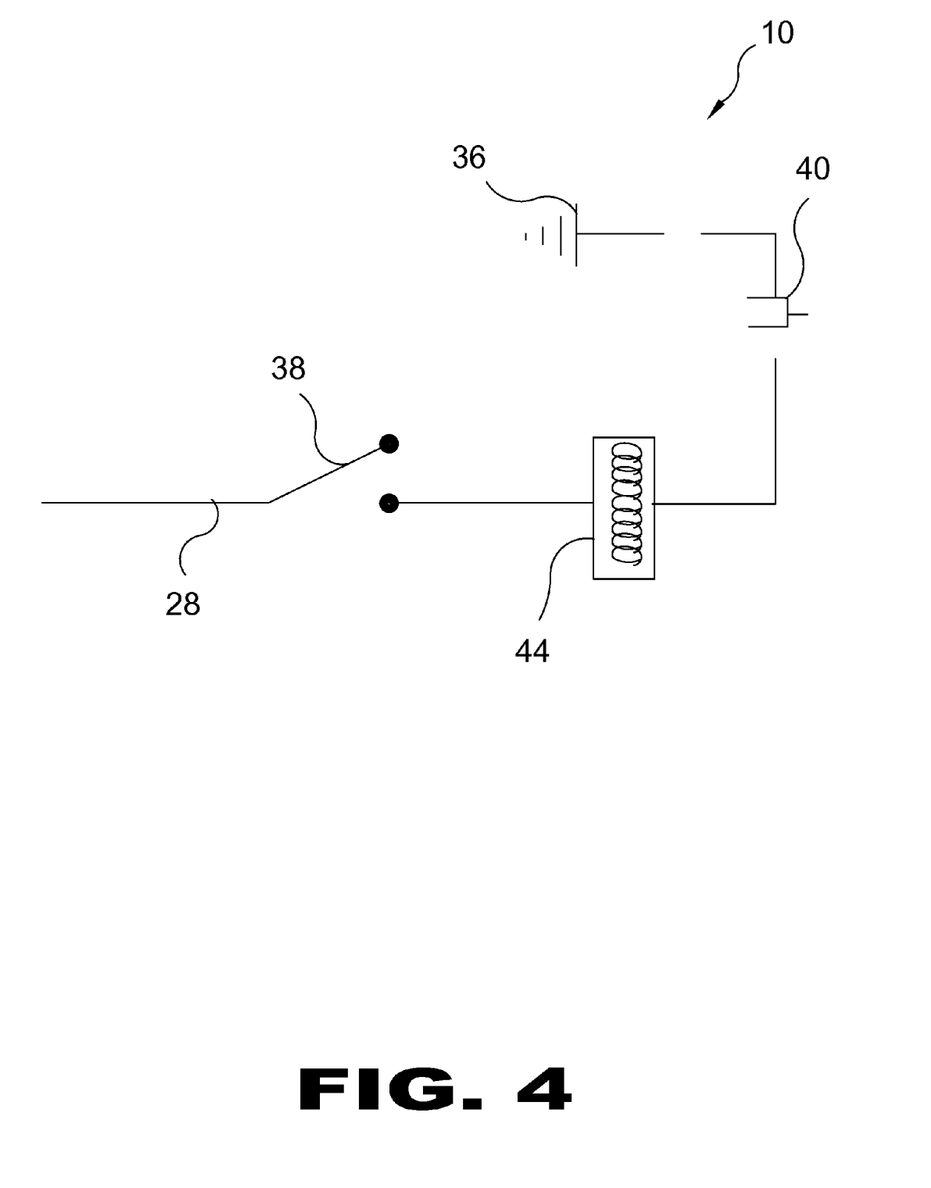
FIG. 4 is a wiring diagram for the Smith Engine.

FIG. 4 is a wiring diagram for the Smith Engine of the present invention 10. Shown are the shielded electrical leads 28 with a secondary switch 38, voltage regulator 40 and battery 36. Also shown in line with the circuitry is a release valve 44 that is part of a pressurized tank. When the switch 38 is closed it provides electricity to a pressurized tank releasing air for propulsion.

Figure 5:
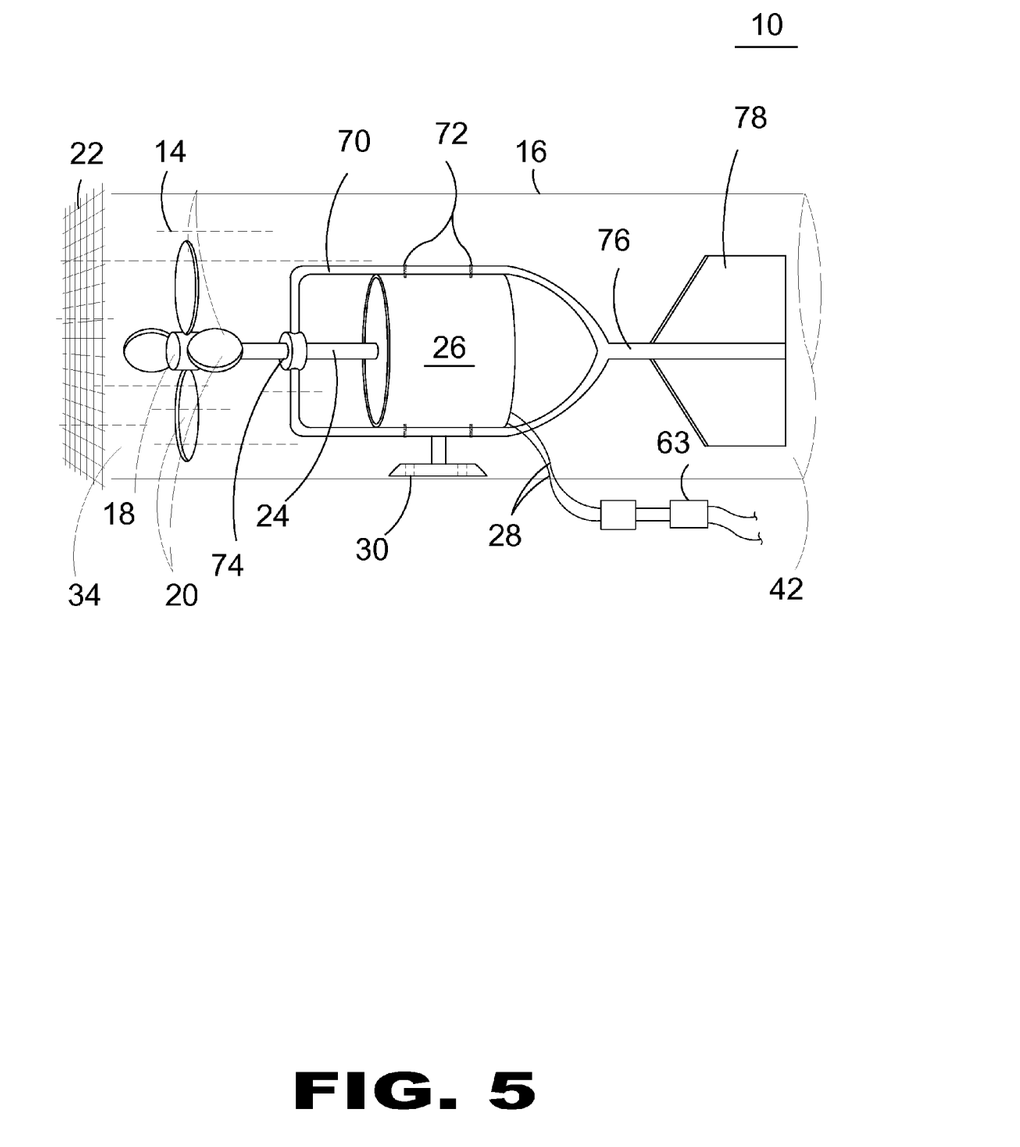
FIG. 5 is a side view of the Smith Engine

FIG. 5 is a side view of the Smith Engine. The Smith Engine 10 is designed to harvest energy from air moving through a vehicle during its normal operation. The Smith Engine 10 comprises at least one housing conduit 16 within motorized vehicle 12 of any shape or size having air ingress port 34 and egress port 42 with the motor 12 located therebetween. The air ingress port 34 has a screen 22 of any shape or size to prevent passage of any organic or inorganic material that may impede the optimal performance of the motor. The motor has a frame 70 of any shape or size that is secured to conduit 16 comprising a channel anchored portion 30 and pivotal portion limited to approximately 45° by a swivel mount stop 31 allowing for the continuance of its optimal energy harvesting position through self alignment established by the motive force of the air flow 14 moving through the bore of conduit 16. At least one free wheeling fan 18 having blades 20 of any shape or size is rotatively mounted by shaft 24 of any shape or size through the pivotal frame portion via bearing 74 to at least one electric motor or generator 26 mounted by fasteners 72 of any shape or size to said pivotal frame portion with the pivotal frame portion extending through a frame arm 76 to a frame vane 78 providing for optimal positioning of the Smith Engine 10 using the direction of incoming wind 14 with the wind forming the fan's 18 rotational motive force driving the electric motor or generator shaft 24. The electric motor/alternator has positive and negative leads 28 connected to a voltage regulator and inverter 63 before being used or stored by the vehicle as an energy source with the vehicular mode of transportation taken from the group of land vehicles, water vehicles, air vehicles, trains, and motorcycles.

Figure 6:
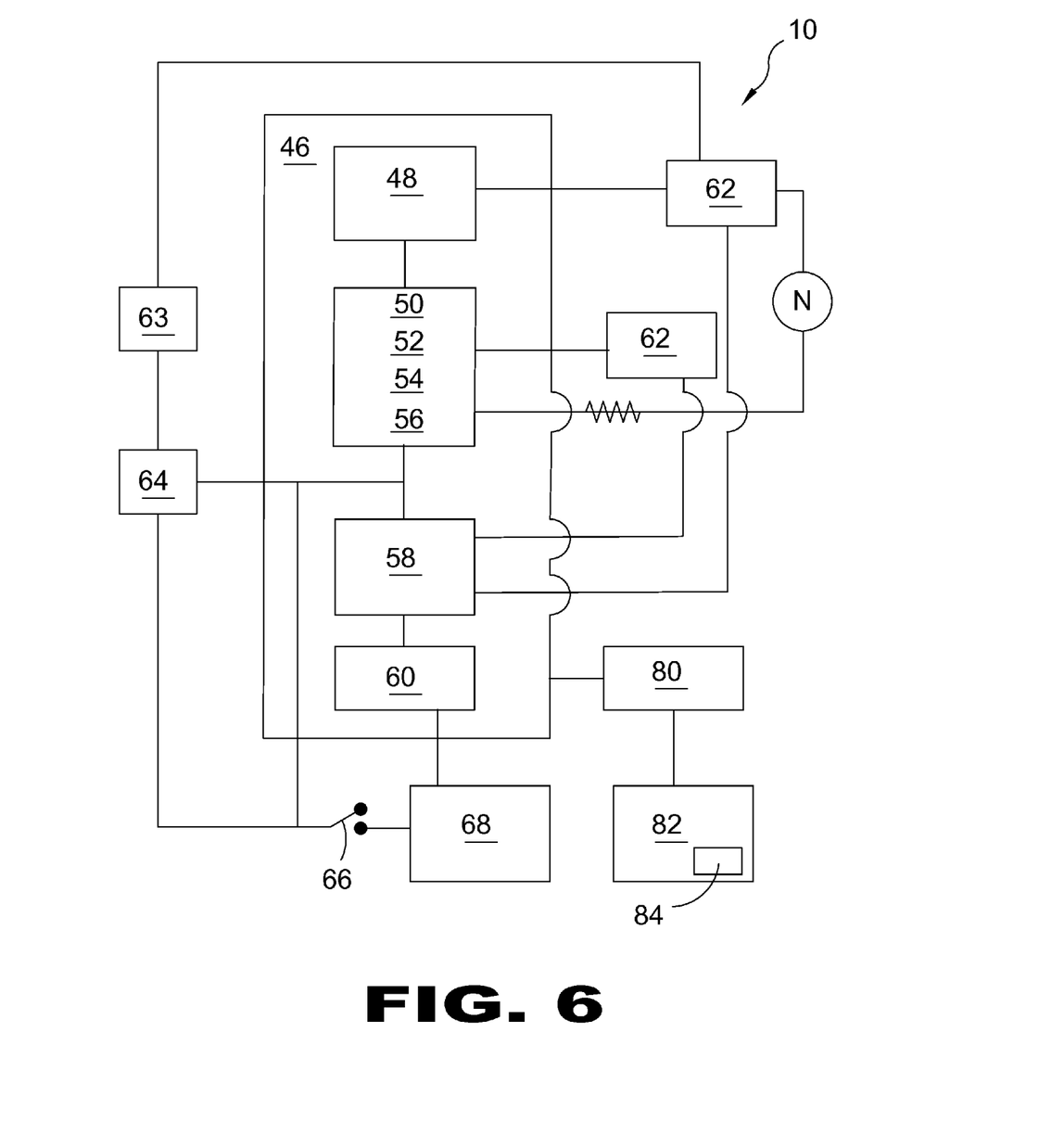
FIG. 6 is a wiring diagram for the circuitry that conducts electricity for the Smith Engine.

FIG. 6 is a wiring diagram for the circuitry that conducts electricity for the Smith Engine of the present invention 10. Shown is the power train 46 comprising a rechargeable battery 48 (solid or liquid), a motor 50, rotor 52, a stator 54 and shaft 56, a generator 58, an inverter 63 and a drive shaft 60. Voltage to the rechargeable battery 48 and the motor 50 is regulated by a pair of potentiometers 62 in line with their respective components. N represents where the circuitry from the Smith 2K can be connected for operation. An alternator 64 is part of the motor 50, rotor 52, stator 54 and shaft 56 assembly. A transfer switch 66 is in line between the alternator 64 and a gasoline engine 68. The transfer switch 66 activates the gasoline engine 68 in the event of the motor 50, rotor 52, stator 54 and drive shaft 60 failing to function. The gasoline engine 68 then becomes part of the motor 50, rotor 52, stator 54 and drive shaft 60 that provides park, forward, neutral and reverse. Also shown is/are sensor(s) 80 that are positioned throughout in electrical communication with audio/visual enabled display 82 for indicating the functioning of the engine's component parts.

Figure 7:
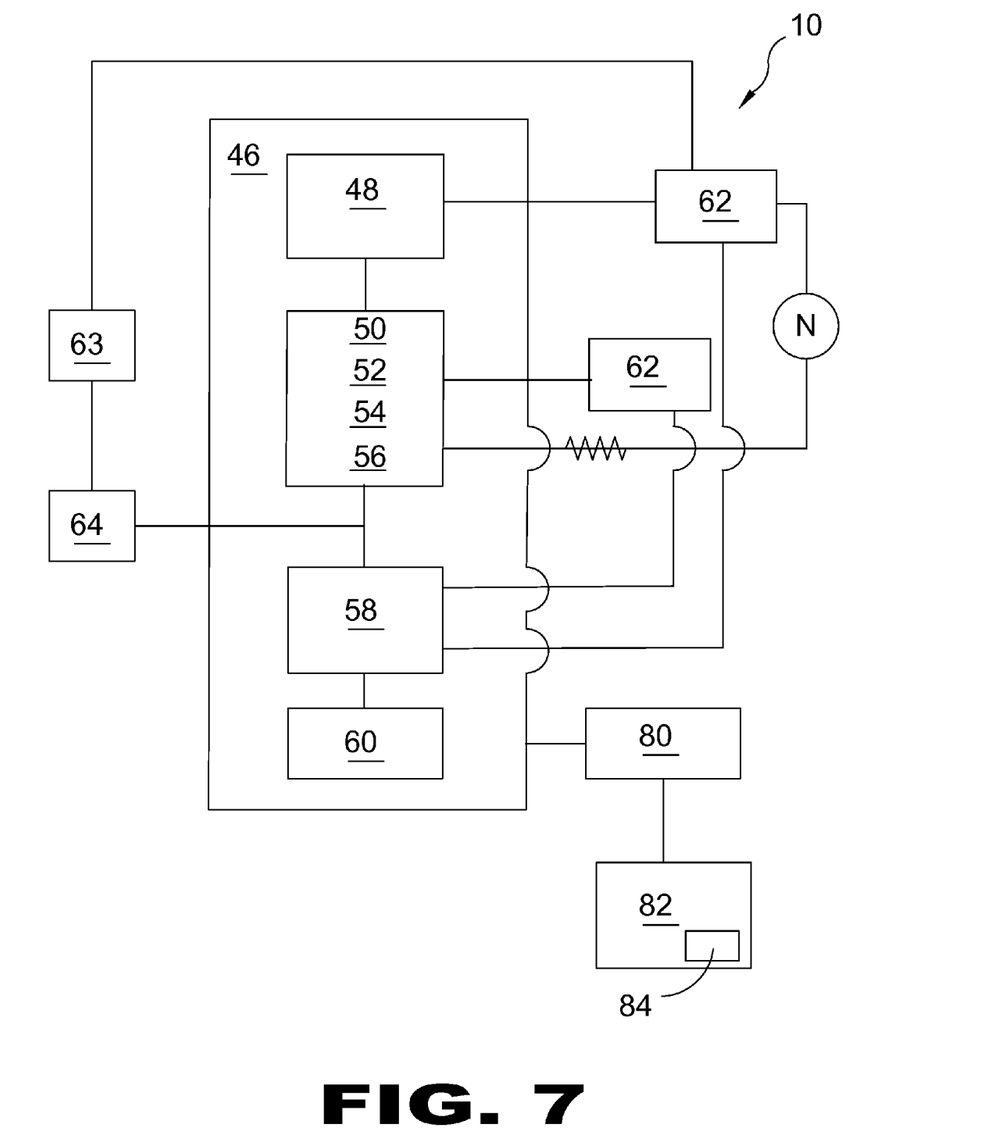
FIG. 7 is an alternate wiring diagram, with the gasoline engine removed, for the circuitry that conducts electricity for the Smith Engine.

FIG. 7 is a wiring diagram, with the gasoline engine removed, for the circuitry that conducts electricity for the Smith Engine of the present invention 10. Shown is the power train 46 comprising a rechargeable battery 48 (solid or liquid), a motor 50, rotor 52, a stator 54 and shaft 56, a generator 58, an inverter 63 and a drive shaft 60. Voltage to the rechargeable battery 48 and the motor 50 is regulated by a pair of potentiometers 62 in line with their respective components. N represents where the circuitry from the Smith 2K can be connected for operation. An alternator 64 is part of the motor 50, rotor 52, stator 54 and shaft 56 assembly. Also shown is/are sensor(s) 80 that are positioned throughout in electrical communication with audio/visual enabled display 82 for indicating the functioning of the engine's component parts.

Figure 8:
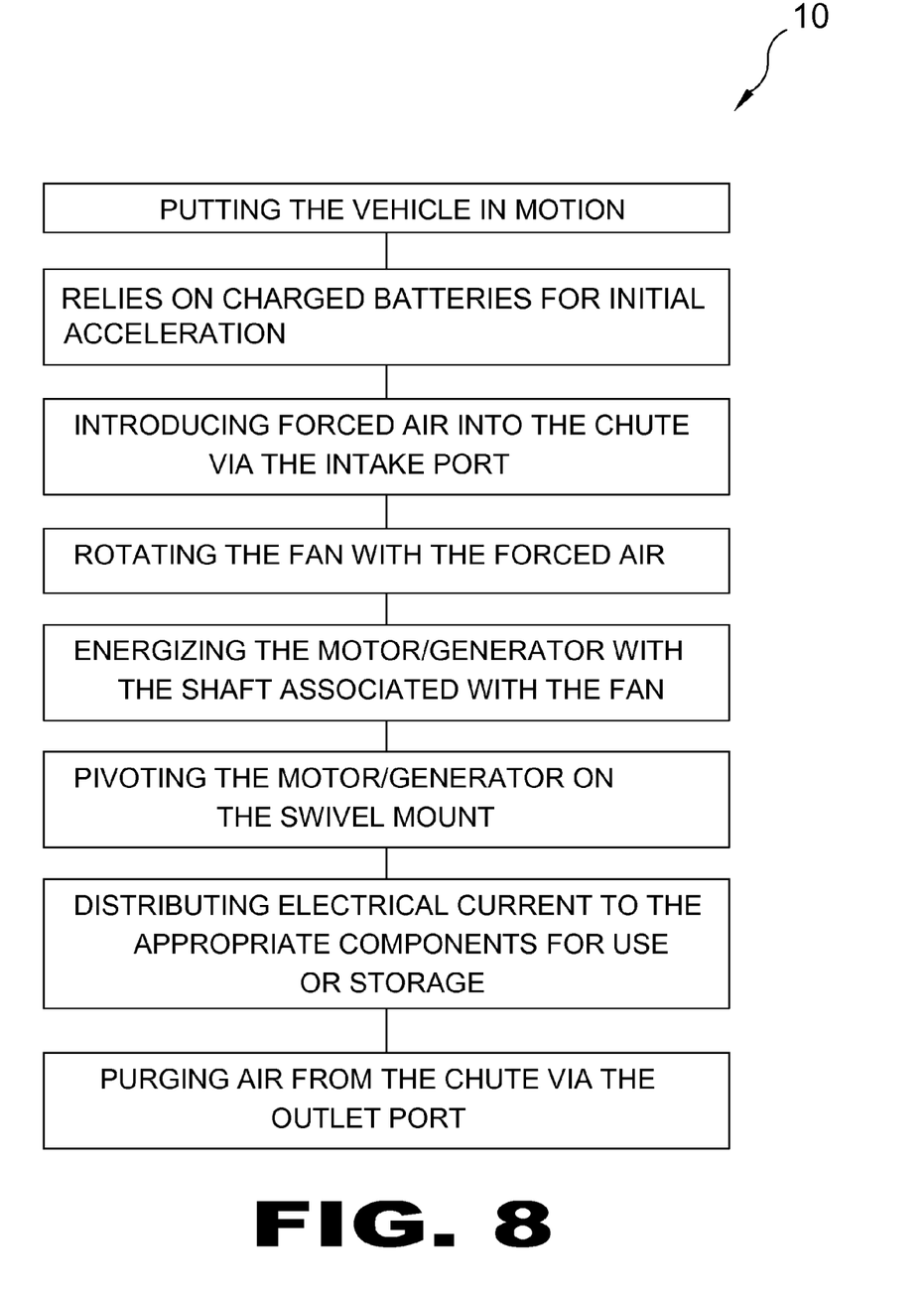
FIG. 8 is a flow chart of the method of operation of the present invention.

FIG. 8 is a flow chart of the method of operation of the present invention 10. The method comprising an initial charge from rechargeable batteries for accelerating a vehicle; introducing forced air into the chute via the intake port; rotating the fan with the forced air; energizing the motor/generator on the swivel mount; monitoring and reporting the status of the fan on an audio and visual enabled display having a switch for muting the audio, if desired; distributing electrical current to the appropriate components for use or storage and purging air from the chute via the outlet port.

Figure 9:
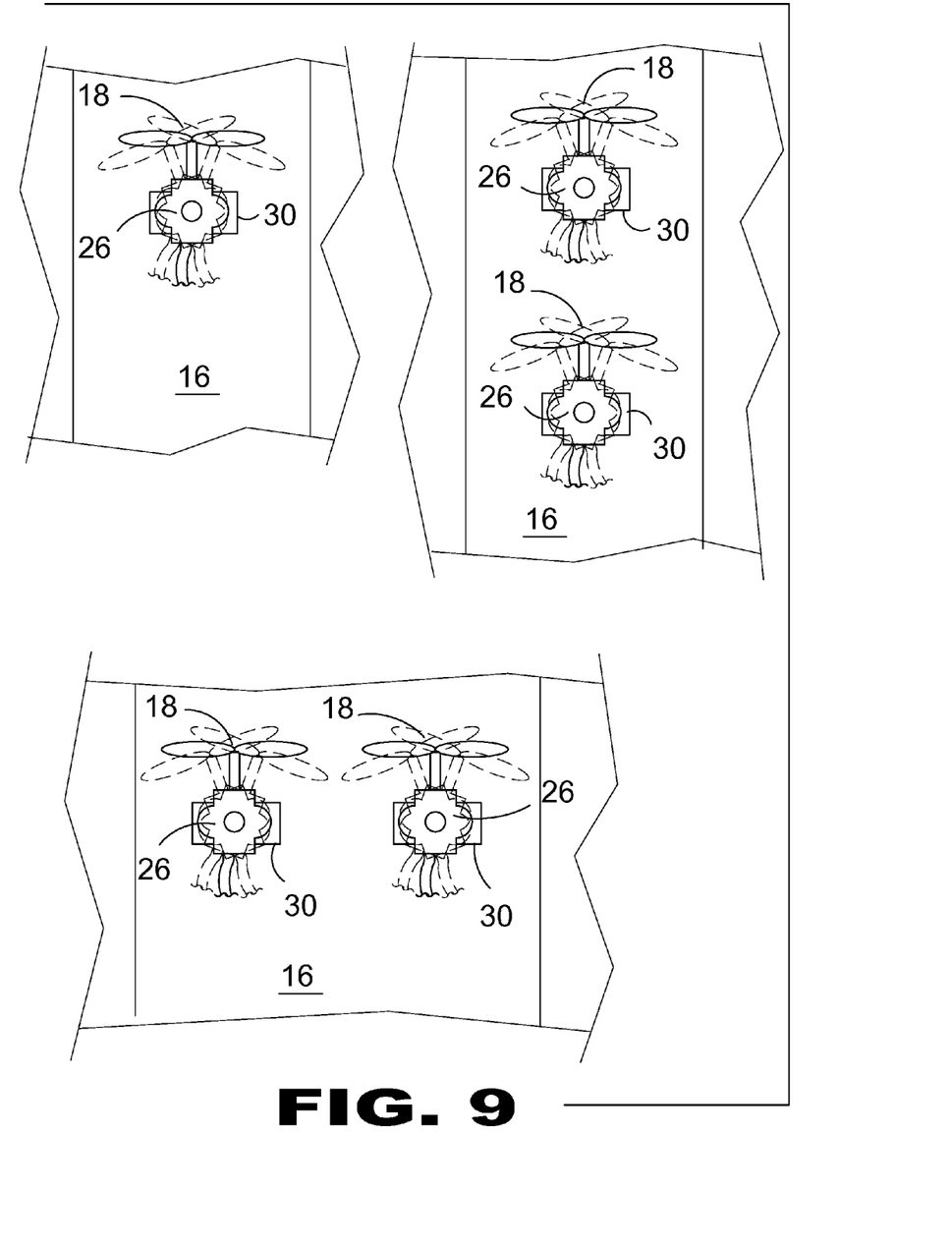
FIG. 9 is an illustrative view of various possible configurations of multiple motor/generators.

FIG. 9 is an illustrative view of several possible configurations using a single and plurality of motor/generators 26 and their related fans 18 to best utilize the pivoting feature attributable to the swivel mounts 30. Also shown is means for monitoring and reporting the status of the Smith Engine fan(s) comprising a display 82 for each fan, with the display 82 enabled with audio and visual and switch 84 for selectively muting the audio signal as desired. The motor/generators 26 and fans 18 are housed within a chute 16, tunnel or conduit of any size, shape or dimension.

Figure 10:
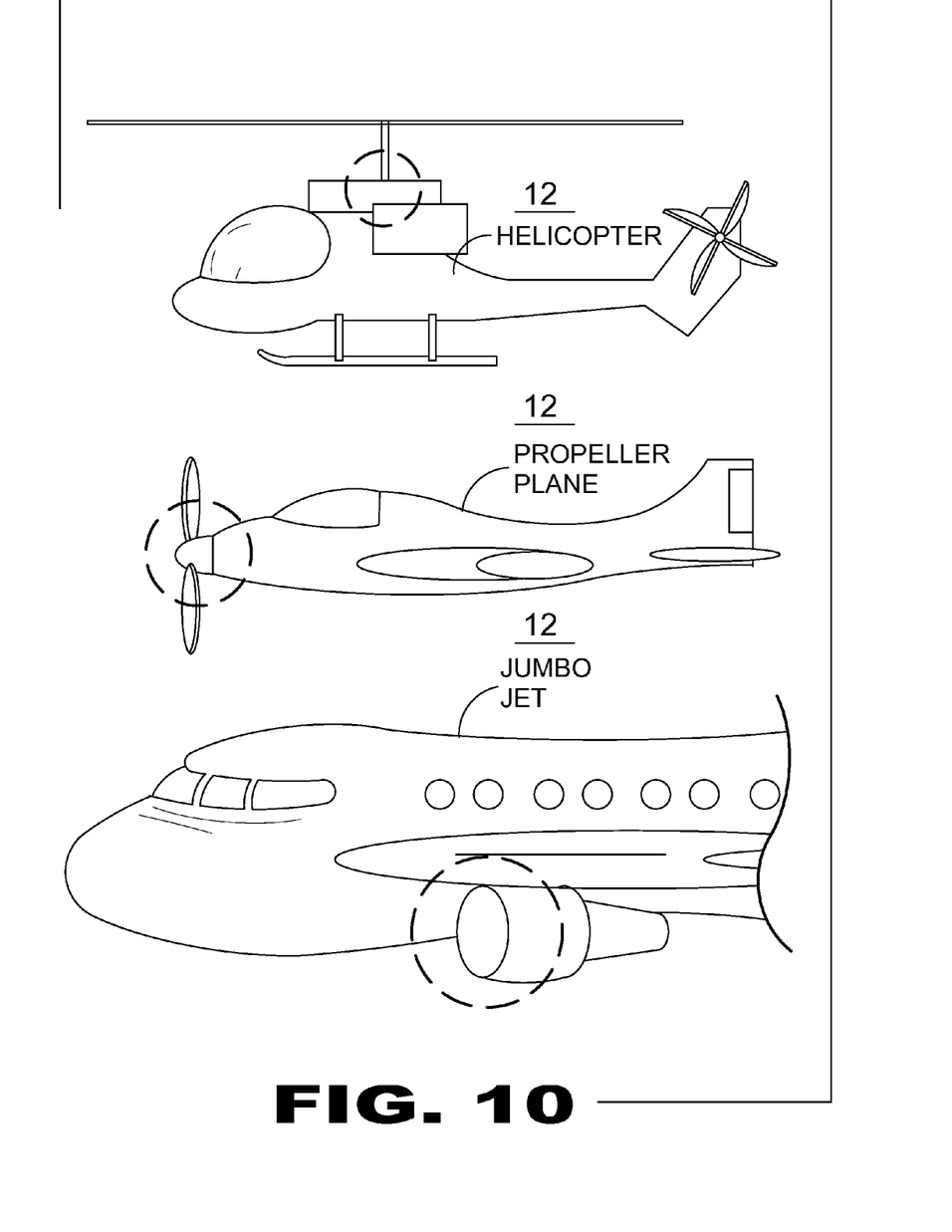
FIG. 10 is an illustrative view of an additional element of the present invention.

FIG. 10 is an illustrative view of an additional element of the present invention. Shown are various vehicles 12 that can be enabled as generators having rotationally driven shafts whether it is an airplane or helicopter using the existing rotation. A switch is provided for engaging the system to use the rotation within a generator system.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The invention claimed is:

1. A wind powered turbine motor for motor vehicles comprising:
   a) an automobile having an internal chute to allow for the passage of air flow therethrough while said automobile is moving forward, said chute being in a front of said automobile at wheel level;
   b) an air intake port in the front of said automobile leading into said chute and a pair of outlet ports disposed toward the rear of said chute;
   c) a fan disposed behind said intake port forward of wheels of said automobile;
   d) an electrical generator within said chute behind said fan;
   e) a shaft having a first end fixed to said fan and a second end rotatively incorporated within said electric generator;
   f) a frame supporting said electric generator and having a bearing for supporting said shaft between said fan and said electric generator;
   g) a swivel mount within and fixed on a bottom of said chute located beneath and supporting said frame for pivotally securing said fan and electric generator within said chute said frame turning on said swivel mount to provide maximum proficiency of air to effect said fan; and
   h) electrical leads originating at said electric generator and terminating at a battery within said automobile.

2. The wind powered motor of for vehicles according to claim 1, in which a frame arm extends from a rear of said frame, and vanes mounted on said frame arm.

3. The wind powered motor of claim 2, wherein said battery is rechargeable.

4. The wind powered motor of claim 3, having a pair of potentiometer(s) for regulating voltage.

5. The wind powered motor of claim 4 in which said automobile has a power train comprising a motor, rotor, stator, shaft and alternator.

6. The wind powered motor of claim 5 having a transfer switch in line between said alternator and a gasoline engine wherein failure of the motor, rotor, stator and shaft to operate closes said transfer switch and activates the gasoline engine.

7. The wind powered motor of claim 6 wherein electrical leads are insulated with rubber.

8. The wind powered motor of claim 1, adaptable for use with all modes of transportation selected from the group of: automobiles, motorcycles, trains, aircraft and watercraft.

9. The wind powered motor of claim 6 further comprising a plurality of sensors for indicating the status of said wind powered motor.

10. The wind powered motor of claim 9, wherein said sensors are in electrical communication with a display having audio and visual properties for reporting the status of said wind powered motor.

11. The wind powered motor of claim 10, further comprising a display shut off switch for the audio.

\* \* \* \* \*